(12) United States Patent
Fukumoto et al.

(10) Patent No.: US 7,859,866 B2
(45) Date of Patent: Dec. 28, 2010

(54) CONTROLLER IC, DC-AC CONVERSION APPARATUS, AND PARALLEL RUNNING SYSTEM OF DC-AC CONVERSION APPARATUSES

(75) Inventors: Kenichi Fukumoto, Kyoto (JP); Yousuke Aoyagi, Kyoto (JP)

(73) Assignee: Rohm Co., Ltd, Kyoto (JP)

( * ) Notice: Subject to any disclaimer, the term of this patent is extended or adjusted under 35 U.S.C. 154(b) by 0 days.

(21) Appl. No.: 12/453,984

(22) Filed: May 28, 2009

(65) Prior Publication Data

US 2009/0237969 A1 Sep. 24, 2009

Related U.S. Application Data

(63) Continuation of application No. 12/213,432, filed on Jun. 19, 2008, now Pat. No. 7,554,823, which is a continuation of application No. 11/666,492, filed on Apr. 27, 2007, now Pat. No. 7,394,671.

(30) Foreign Application Priority Data

Nov. 12, 2004 (JP) ............................ P2004-329572

(51) Int. Cl.
*H02M 3/335* (2006.01)
(52) U.S. Cl. .............................. 363/25; 363/24; 363/26; 363/56.06; 363/133; 363/134
(58) Field of Classification Search .................. 363/24, 363/25, 26, 56.06, 133, 134
See application file for complete search history.

(56) References Cited

U.S. PATENT DOCUMENTS

| | | | | |
|---|---|---|---|---|
| 5,767,744 A | * | 6/1998 | Irwin et al. | ................... 330/297 |
| 5,852,555 A | * | 12/1998 | Martin | ......................... 363/71 |
| 6,445,599 B1 | * | 9/2002 | Nguyen | ....................... 363/25 |
| 6,504,735 B2 | * | 1/2003 | Negru et al. | ................... 363/25 |
| 6,940,233 B2 | * | 9/2005 | Gray | ........................... 315/276 |
| 6,961,253 B1 | * | 11/2005 | Cohen | ......................... 363/89 |
| 7,019,507 B1 | * | 3/2006 | Dittmer et al. | ............... 323/284 |
| 7,046,526 B2 | * | 5/2006 | Toda et al. | .................... 363/24 |
| 7,078,868 B2 | * | 7/2006 | Samejima et al. | ........... 315/219 |
| 2002/0172057 A1 | * | 11/2002 | Tolle et al. | ..................... 363/24 |
| 2003/0035307 A1 | * | 2/2003 | Matsuura et al. | .............. 363/25 |

FOREIGN PATENT DOCUMENTS

JP 62-130016 6/1987
JP 6-14556 1/1994

(Continued)

*Primary Examiner*—Bao Q Vu
(74) *Attorney, Agent, or Firm*—Morgan, Lewis & Bockius LLP (57) ABSTRACT

A DC power source voltage is supplied to a center tap of a primary winding, and first and second semiconductor switches alternately turned on are disposed between each of both ends of the primary winding and a common potential point, and a current flowing through a load is fed back and PWM control of each of the semiconductor switches is performed. Also, snubber circuits are respectively connected between a ground and the center tap of the primary winding, and an abnormal high voltage at the time of switching is reduced. Also, a parallel running of plural inverters is simply performed by disposing PWM comparators corresponding to the first and second semiconductor switches.

9 Claims, 8 Drawing Sheets

FOREIGN PATENT DOCUMENTS

| | | |
|---|---|---|
| JP | 6-113555 | 4/1994 |
| JP | 11/146648 | 5/1999 |
| JP | 2001-126891 | 5/2001 |
| JP | 2002-500427 | 1/2002 |
| JP | 2004-166446 | 6/2004 |
| JP | 2004-519978 | 7/2004 |
| JP | 2004-222489 | 8/2004 |
| JP | 2004-260992 | 9/2004 |

* cited by examiner

FIG. 6 (iii)

CONTROLLER IC, DC-AC CONVERSION APPARATUS, AND PARALLEL RUNNING SYSTEM OF DC-AC CONVERSION APPARATUSES

This is a continuation of copending application Ser. No. 12/213,432, filed Jun. 19, 2008 now U.S. Pat. No. 7,554,823, which is a continuation of application Ser. No. 11/666,492, now U.S. Pat. No. 7,394,671, filed on Apr. 27, 2007, and issued Jul. 1, 2008, and claims the benefit of Japanese Patent Application No. 2004-329572, filed in Japan on Nov. 12, 2004, which are hereby incorporated by reference.

The present invention relates to a DC-AC conversion apparatus (hereinafter called an inverter) for generating an AC voltage for driving a load from a DC power source of a battery etc. or a power source adapter attached to electrical equipment, a controller IC used in the inverter, and a parallel running system of plural inverters.

BACKGROUND OF THE INVENTION

Field of the Invention

A cold cathode fluorescent lamp (CCFL) has been used as a backlight light source of a liquid crystal display such as a liquid crystal television set or a liquid crystal monitor of a notebook personal computer. This CCFL generally has higher efficiency and longer life than those of a normal hot cathode fluorescent lamp and then, a filament which the hot cathode fluorescent lamp has is omitted.

A high AC voltage is required in order to start and operate this CCFL. For example, a starting voltage is about 1000 V and an operating voltage is about 600 V. This high AC voltage is generated from a DC power source of a notebook personal computer, a liquid crystal television set, etc. using an inverter.

Conventionally, a Royer circuit has generally been used as an inverter for CCFL. This Royer circuit is constructed of a saturable magnetic core transformer, a control transistor, etc., and then self-oscillates by characteristics of non-linear current gain of the control transistor and non-linear magnetic permeability of the saturable magnetic core transformer. The Royer circuit itself does not require an external clock or a driver circuit.

However, the Royer circuit is basically a constant-voltage inverter, and cannot maintain a constant output voltage when an input voltage or a load current varies. Therefore, a regulator for supplying electric power to the Royer circuit is required. Because of this, it is difficult to miniaturize the inverter using the Royer circuit and also, electric power conversion efficiency is low.

An inverter using a center tap type transformer having a primary winding in which a DC voltage is supplied to a center tap and a secondary winding for AC voltage output has been proposed (see JP-T-2002-500427 and JP-A-6-14556).

In the inverter of JP-T-2002-500427, a DC voltage is supplied to a center tap of a primary winding and semiconductor switches are respectively had between a ground and each end of the primary winding and their semiconductor switches are alternately turned on and off. A PWM control apparatus for performing PWM control of a DC voltage supplied to its inverter is disposed. Then, electric power supplied from the inverter to a load is controlled by control of a DC current by the PWM control apparatus.

The inverter of JP-A-6-14556 comprises a step-up transformer having a primary winding in which a DC power source is connected to a center tap, a secondary winding for AC voltage output and a tertiary winding for feedback, a resonance capacitor which is connected between both ends of the primary winding of its step-up transformer and constructs an LC resonance circuit between the resonance capacitor and an inductance of this primary winding, a pair of semiconductor switches alternately turned on and off by an output voltage of the tertiary winding, one end sides of the semiconductor switches being respectively connected to the different ends of its resonance capacitor and the other end sides being earthed, and a variable inductor connected to the inside of its LC resonance circuit. Then, an output voltage of the inverter is controlled by controlling an inductance of the variable inductor.

Means using a Royer circuit has problems that it is difficult to miniaturize the means and also conversion efficiency is low. In the inverter of JP-T-2002-500427, the PWM control apparatus for performing PWM control of a DC voltage supplied to its inverter is required in addition to the inverter, so that a structure as the whole DC-AC conversion apparatus becomes complicated and also it is difficult to miniaturize the inverter. Also, the inverter of JP-A-6-14556 comprises the variable inductor connected to the inside of the LC resonance circuit and an output voltage is controlled by controlling its inductance, so that a structure becomes complicated and also it is difficult to miniaturize the inverter.

Further, with an increase in screen size of a liquid crystal display such as a liquid crystal television set or a liquid crystal monitor of a notebook personal computer, plural CCFLs have been distributed and arranged as a backlight light source. In this case, light from the plural CCFLs mutually interferes and becomes a cause of flicker etc., so that it becomes necessary to synchronously turn on each of the CCFLs in the same phase.

For this purpose, it is contemplated to construct an inverter of a discrete circuit and supply AC power of the same phase to plural CCFLs.

However, by reasons that it is necessary to reduce an influence on other apparatus by decreasing a routed distance of high-voltage wiring to the CCFL and also that parasitic capacitance of the CCFL is effectively used in resonance with a transformer, it is desirable that the inverter for controlling each of the CCFLs be arranged as close as possible to the CCFLs.

JP-T-2002-500427 and JP-A-6-14556 are seen as the related art.

SUMMARY OF THE INVENTION

An object of the invention is to provide a DC-AC conversion apparatus (an inverter) for generating an AC voltage for driving a load from a DC power source, a DC-AC conversion apparatus suitable for parallel running of plural loads, the DC-AC conversion apparatus capable of finely adjusting electric power supply to the loads by a simple configuration using a transformer having a primary winding with a center tap to which a DC voltage is supplied, a controller IC used in the DC-AC conversion apparatus, and a parallel running system for synchronously controlling plural DC-AC conversion apparatus in the same phase.

The invention provides a controller IC for controlling a first semiconductor switch and a second semiconductor switch for driving a load, having an oscillator block for generating a first triangular wave signal and a second triangular wave signal having a relation in which the first triangular wave signal is reversed when a capacitor for frequency decision and a resistor for frequency decision are connected, a pulse width modulation circuit for comparing the first triangular wave signal with a feedback signal formed based on a current flowing through the load and generating a first pulse width modulation signal and comparing the second triangular wave signal with the feedback signal and generating a second pulse width modulation signal, and a driving signal output block for alternately outputting a first switch driving signal for turning on the first semiconductor switch based on the first pulse width modulation signal and a second switch driving signal for turning on the second semiconductor switch based on the second pulse width modulation signal, characterized in that the driving signal output block generates the first switch driving signal and the second switch driving signal at timing at which an off period during which both of the first semiconductor switch and the second semiconductor switch are turned off is set between a period for which the first semiconductor switch is in the on state and a period for which the second semiconductor switch is in the on state.

In the controller IC, the oscillator block to which the capacitor for frequency decision and the resistor for frequency decision are not connected generates a triangular wave signal supplied from the outside and a triangular wave signal having a relation in which the triangular wave signal is reversed.

In the controller IC, the driving signal output block outputs the first switch driving signal from a point in time of one vertex of the first triangular wave signal to a point in time when the first triangular wave signal immediately after the point in time becomes equal to the feedback signal, and outputs the second switch driving signal from a point in time of the one vertex of the second triangular wave signal to a point in time when the second triangular wave signal immediately after the point in time becomes equal to the feedback signal.

The invention also provides a DC-AC conversion apparatus having a transformer having a primary winding with a center tap and at least one secondary winding, the center tap being connected to a first potential point of a DC power source, a first semiconductor switch connected between one end of the primary winding and a second potential point of the DC power source, a second semiconductor switch connected between the other end of the primary winding and the second potential point, a current detection circuit for detecting a current flowing through a load connected to the secondary winding, an oscillation circuit for generating a first triangular wave signal and a second triangular wave signal having a relation in which the first triangular wave signal is reversed, a pulse width modulation circuit for comparing the first triangular wave signal with a feedback signal formed based on a current detected by the current detection circuit and generating a first pulse width modulation signal and comparing the second triangular wave signal with the feedback signal and generating a second pulse width modulation signal, and a driving signal output circuit for alternately outputting a first switch driving signal for turning on the first semiconductor switch based on the first pulse width modulation signal and a second switch driving signal for turning on the second semiconductor switch based on the second pulse width modulation signal, characterized in that the driving signal output circuit generates the first switch driving signal and the second switch driving signal at timing at which an off period during which both of the first semiconductor switch and the second semiconductor switch are turned off is set between a period for which the first semiconductor switch is in the on state and a period for which the second semiconductor switch is in the on state.

In the DC-AC conversion apparatus, the driving signal output circuit outputs the first switch driving signal from a point in time of one vertex of the first triangular wave signal to a point in time when the first triangular wave signal immediately after the point in time becomes equal to the feedback signal, and outputs the second switch driving signal from a point in time of the one vertex of the second triangular wave signal to a point in time when the second triangular wave signal immediately after the point in time becomes equal to the feedback signal.

The DC-AC conversion apparatus has a first snubber circuit connected between one end of the primary winding and the second potential point and a second snubber circuit connected between the other end of the primary winding and the second potential point.

The DC-AC conversion apparatus has a first snubber circuit connected between one end of the primary winding and the first potential point and a second snubber circuit connected between the other end of the primary winding and the first potential point.

In the DC-AC conversion apparatus, the first potential point is a contact point to which a power source voltage of the DC power source is applied and the second potential point is a ground.

The invention also provides a parallel running system of DC-AC conversion apparatuses, having a transformer having a primary winding with a center tap and at least one secondary winding, the center tap being connected to a first potential point of a DC power source, a first semiconductor switch connected between one end of the primary winding and a second potential point of the DC power source, a second semiconductor switch connected between the other end of the primary winding and the second potential point, a current detection circuit for detecting a current flowing through a load FL connected to the secondary winding, an oscillation circuit for generating a first triangular wave signal and a second triangular wave signal having a relation in which the first triangular wave signal is reversed when a capacitor for frequency decision and a resistor for frequency decision are connected and also generating a triangular wave signal supplied from the outside and a triangular wave signal having a relation in which the triangular wave signal is reversed when the capacitor for frequency decision and the resistor for frequency decision are not connected, a pulse width modulation circuit for comparing the first triangular wave signal with a feedback signal formed based on a current detected by the current detection circuit and generating a first pulse width modulation signal and comparing the second triangular wave signal with the feedback signal and generating a second pulse width modulation signal, and a driving signal output circuit for alternately outputting a first switch driving signal for turning on the first semiconductor switch based on the first pulse width modulation signal and a second switch driving signal for turning on the second semiconductor switch based on the second pulse width modulation signal, the parallel running system having plural DC-AC conversion apparatuses in which the driving signal output circuit generates the first switch driving signal and the second switch driving signal at timing at which an off period during which both of the first semiconductor switch and the second semiconductor switch are turned off is set between a period for which the first semiconductor switch is in the on state and a period for which the second semiconductor switch is in the on state, characterized in that the capacitor for frequency decision and the resistor for frequency decision are connected to the oscillation circuit in only one of the plural DC-AC conversion apparatuses, and the first DC-AC conversion apparatus having the oscillation circuit to which the capacitor for frequency decision and the resistor for frequency decision are connected supplies only the first triangular wave signal of the first triangular wave signal and the second triangular wave signal generated from the oscillation circuit to the DC-AC conversion apparatuses other than the first DC-AC conversion apparatus, and the plural DC-AC conversion apparatuses perform pulse width modulation control of the same phase synchronously respectively using the first triangular wave signal and the second triangular wave signal.

In the parallel running system of the DC-AC conversion apparatuses, a resistance value of the resistor for frequency decision is set at different values after starting and at the time of starting of the DC-AC conversion apparatus, and the resistance value set at the time of the starting is smaller than the resistance value set after the starting.

According to the controller IC, the DC-AC conversion apparatus and the parallel running system of the DC-AC conversion apparatuses described above, in the DC-AC conversion apparatus for generating an AC voltage for driving a load from a DC power source, a transformer having a primary winding with a center tap to which a DC power source voltage is supplied is used and a first semiconductor switch and a second semiconductor switch alternately turned on are disposed between each end of the primary winding and a common potential point and a current flowing through a load is fed back and pulse width modulation (PWM) control of each of the semiconductor switches is performed, so that electric power supply to the load can be finely adjusted by a simple configuration.

Also, a pulse width modulation circuit generates a first pulse width modulation signal for controlling a first semiconductor switch by comparison between a first triangular wave signal and a feedback signal, and generates a second pulse width modulation signal for controlling a second semiconductor switch by comparison between a feedback signal and a second triangular wave signal having a relation in which the first triangular wave signal is reversed. Therefore, in the case of parallel running plural DC-AC conversion apparatuses, only the first triangular wave signal is simply transmitted between the DC-AC conversion apparatuses, so that synchronization between the plural DC-AC conversion apparatuses can be obtained more simply than ever before.

Also, snubber circuits are respectively disposed between a low impedance point (that is, a second potential point or a first potential point) and both ends of a primary winding. As a result of this, occurrence of an abnormal high voltage applied to a first semiconductor switch and a second semiconductor switch at the time of switching can be suppressed. Particularly, in a push-pull configuration, a voltage two times the power source voltage is always applied, so that suppression of the abnormal voltage is particularly effective.

DETAILED DESCRIPTION OF THE PREFERRED EMBODIMENTS

Description of Reference Numerals and Signs

TR TRANSFORMER WITH CENTER TAP
FL COLD CATHODE FLUORESCENT LAMP
BAT DC POWER SOURCE (BATTERY POWER SOURCE)
101,102 FIRST, SECOND SEMICONDUCTOR SWITCH
103,105 RESISTOR FOR SNUBBER
104,106 CAPACITOR FOR SNUBBER
200,200A~200N IC FOR INVERTER CONTROL
201 OSC BLOCK
202 BOSC BLOCK
203 LOGIC BLOCK
204 OUTPUT BLOCK
250 PWM BLOCK
251,252 FIRST, SECOND PWM COMPARATOR
VDD POWER SOURCE VOLTAGE
VCC POWER SOURCE VOLTAGE
N1,N2 GATE DRIVING SIGNAL
STB STARTING SIGNAL
CT FIRST TRIANGULAR WAVE SIGNAL FOR PWM
CTI SECOND TRIANGULAR WAVE SIGNAL FOR PWM
FB FEEDBACK VOLTAGE
IS DETECTION CURRENT
SS SLOW START VOLTAGE
BCT TRIANGULAR WAVE SIGNAL FOR BURST
DUTY DUTY SIGNAL FOR BURST

An embodiment of an inverter for generating an AC voltage for driving a load from a DC power source and a parallel running system of the inverters of the invention will be described below with reference to the drawings.

Figure 1:
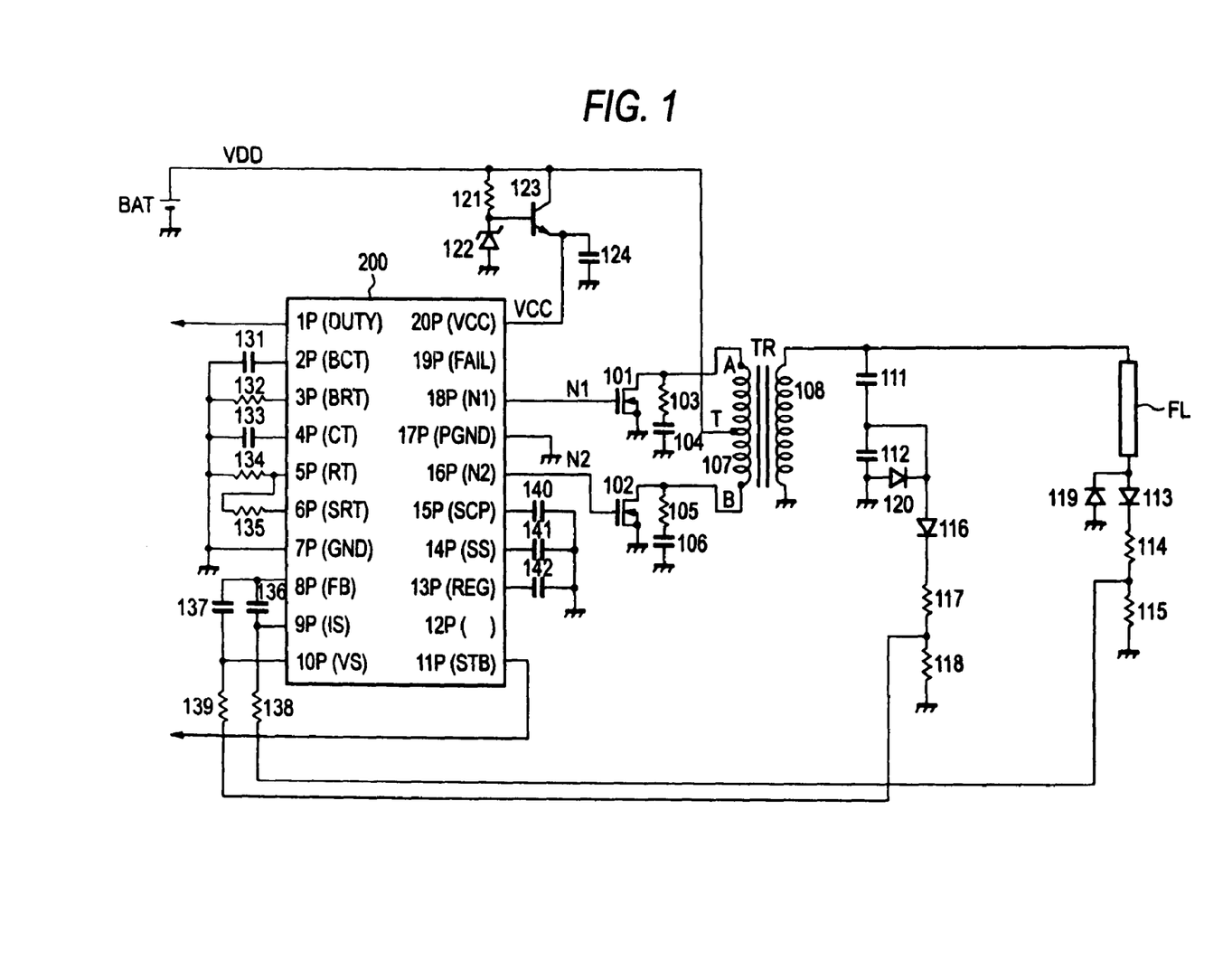
FIG. 1 is a diagram showing the whole configuration of an inverter according to an embodiment of the invention.
Figure 2:
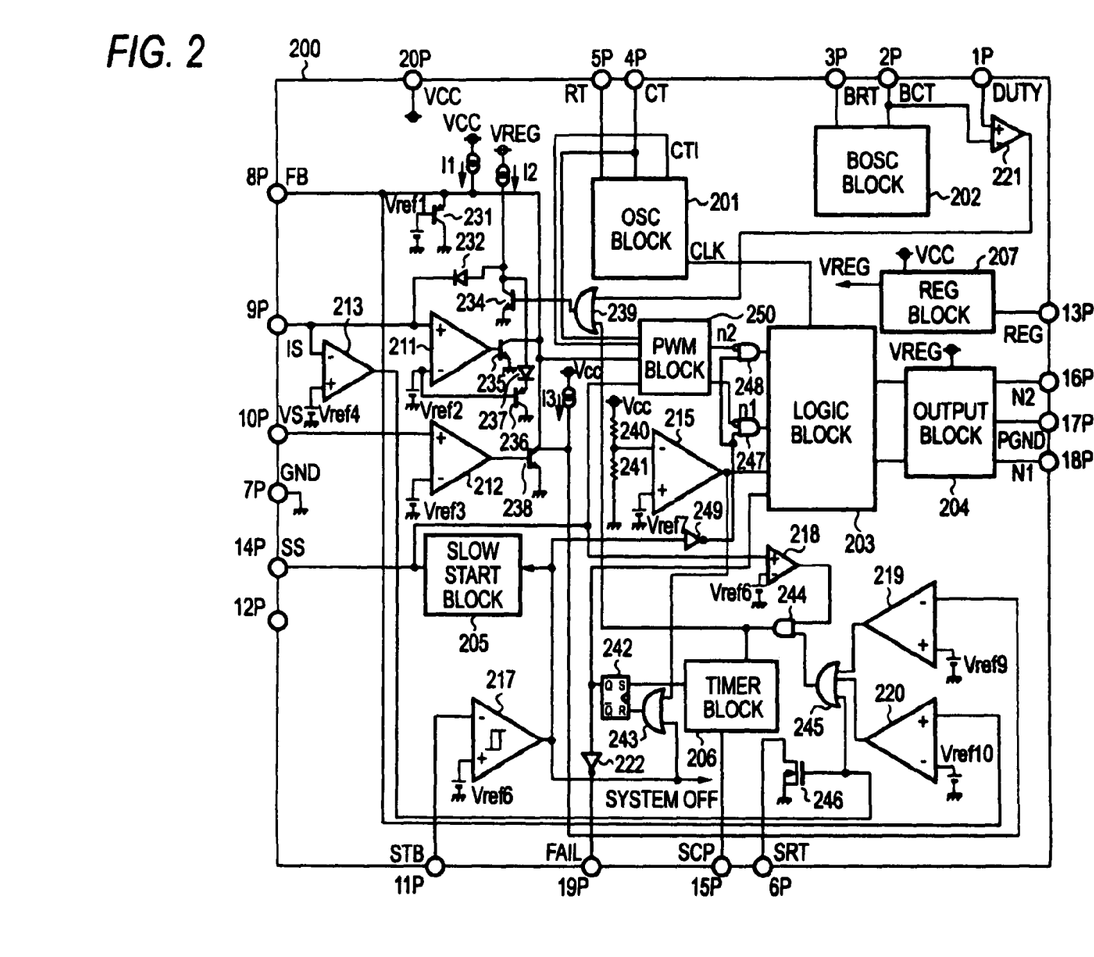
FIG. 2 is a diagram showing an internal configuration of an IC 200 for inverter control for FIG. 1.

FIG. 1 is a diagram showing the whole configuration of an inverter according to an embodiment of the invention for performing PWM control using a semiconductor switch circuit and an insulating transformer TR having a primary winding with a center tap and a secondary winding. FIG. 2 is a diagram showing an internal configuration of an IC 200 for inverter control therefor.

In FIG. 1, the transformer TR is an insulating transformer having a secondary winding 108 for supplying AC electric power to a load, and a primary winding 107 having a center tap T, a terminal (hereinafter called a first terminal) A of one end and a terminal (hereinafter called a second terminal) B of the other end. A power source voltage VDD from a battery power source BAT is supplied to the center tap T of this transformer TR. This DC power source voltage VDD is a voltage with respect to a ground GND which is a common potential point.

Also, the voltage VDD of the battery power source BAT is adjusted to a predetermined power source voltage VCC (for example, 5 to 14 V) of the IC 200 by a series regulator made of a resistor 121, a Zener diode 122 and an NPN type bipolar transistor (hereinafter called an NPN) 123, and is supplied to the IC 200. In addition, a capacitor 124 is a capacitor for stability.

An N type MOSFET (hereinafter called an NMOS) 101 which is a first semiconductor switch is a switch for forming a current path of a first direction to the primary winding 107 of the transformer TR. Also, an NMOS 102 which is a second semiconductor switch is a switch for forming a current path of a second direction to the primary winding 107 of the transformer TR. An alternating current flows through the primary winding 107 of the transformer TR by alternately turning on and off this NMOS 101 and the NMOS 102.

Also, a first snubber circuit made of a series circuit of a first resistor 103 and a first capacitor 104 is connected between the ground and the first terminal A of the primary winding 107. Similarly, a snubber circuit made of a series circuit of a second resistor 105 and a second capacitor 106 is connected between the ground and the second terminal B of the primary winding 107. These first and second snubber circuits suppress an abnormal high voltage such as a surge voltage occurring in the first and second terminals A, B.

These NMOS 101 and NMOS 102 have body diodes (that is, back gate diodes), respectively. A current of a direction opposite to the original current path can be passed by this body diode. In addition, a diode for performing a function similar to the body diode may be disposed separately.

The power source voltage VDD of the DC power source BAT is supplied to the primary winding 107 of the transformer TR through the NMOS 101 and the NMOS 102, and a high voltage according to a winding ratio is induced in its secondary winding 108. This induced high voltage is supplied to a cold cathode fluorescent lamp FL which is a load, and the cold cathode fluorescent lamp FL lights up.

Together with a capacitor 111, a capacitor 112, a resistor 117 and a resistor 1118, a voltage applied to the cold cathode fluorescent lamp FL is detected and is fed back to the controller IC 200. A resistor 114 and a resistor 115 detect a current flowing through the cold cathode fluorescent lamp FL and feed back the current to the controller IC 200. Also, the capacitor 111 is means for producing resonance by its capacitance and an inductance component of the transformer TR, and parasitic capacitance of the cold cathode fluorescent lamp FL also contributes to this resonance. Numerals 113, 116, 119, 120 are diodes.

The controller IC 200 has plural input-output pins. A first pin 1P is a terminal of switching between a PWM mode and an intermittent operation (hereinafter called a burst) mode, and a duty signal DUTY for deciding a duty ratio at the time of the burst mode and switching of their modes is inputted from the outside. A second pin 2P is an oscillation frequency setting capacity connection terminal of a burst mode oscillator (BOSC), and a capacitor 131 for setting is connected and a triangular wave signal BCT for burst is generated. A third pin 3P is an oscillation frequency setting resistance connection terminal of the BOSC, and a resistor 132 for setting is connected.

A fourth pin 4P is an oscillation frequency setting capacity connection terminal of a PWM mode oscillator (OSC), and a capacitor 133 for setting is connected and a triangular wave signal CT for PWM is generated. A fifth pin 5P is a resistance connection terminal for setting a charging current to the fourth pin 4P, and a resistor 134 for setting is connected and a current according to its potential RT and a resistance value flows.

A sixth pin 6P is a resistance connection terminal for setting a charging current to the fourth pin 4P, and a resistor 135 for setting is connected and by control of an internal circuit, this resistor 135 is connected in parallel with the resistor 134 for setting or disconnected and its potential SRT becomes a ground potential GND or the potential RT of the fifth pin 5P. A seventh pin 7P is a ground terminal and is in the ground potential GND.

An eighth pin 8P is a first error amplifier output terminal and a capacitor 136 is connected between this eighth pin 8P and a ninth pin 9P. A potential of the eighth pin 8P becomes a feedback voltage FB and becomes a control voltage for PWM control. Hereinafter, each of the voltages is based on the ground potential unless otherwise specified.

A current detection signal (hereinafter called a detection current) IS according to a current flowing through the cold cathode fluorescent lamp FL is inputted to the ninth pin 9P through a resistor 138 and is inputted to a first error amplifier.

A voltage detection signal (hereinafter called a detection voltage) VS according to a voltage applied to the cold cathode fluorescent lamp FL is inputted to a tenth pin 10P through a resistor 139 and is inputted to a second error amplifier. A capacitor 137 is connected between the tenth pin 10P and the eighth pin 8P.

An eleventh pin 11P is a starting signal input terminal, and a starting signal STB is applied. A twelfth pin 12P is a blank terminal in this example.

A thirteenth pin 13P is a terminal for regulator and is connected to a regulator block in its inside. A capacitor 142 connected to the pin 13P is used for stability operation of the regulator.

A fourteenth pin 14P is a slow start setting capacity connection terminal and a capacitor 141 is connected between the pin 14P and the ground, and a voltage SS for slow start for gradually increasing at the time of starting is generated.

A fifteenth pin 15P is a timer latch setting capacity connection terminal, and a capacitor 140 for deciding operation timing for internal protection operation is connected, and a potential SCP according to an electric charge of the capacitor 140 is generated.

A sixteenth pin 16P is a terminal for outputting a gate driving signal N2 of the NMOS 102. A seventeenth pin 17P is a ground terminal PGND of an external FET drive circuit. An eighteenth pin 18P is a terminal for outputting a gate driving signal N1 of the NMOS 101.

A nineteenth pin 19P is a terminal FAIL for outputting a failure detection signal detected in the inside to the outside. A twentieth pin 20P is a power source terminal for inputting the power source voltage VCC in the IC 200.

In FIG. 2 showing the internal configuration of the controller IC 200, an OSC block 201 generates a first triangular wave signal CT for PWM in which a cycle etc. are decided by the resistors 134, 135 connected to the fifth pin 5P and the capacitor 133 connected to the fourth pin 4P and a second triangular wave signal CTI having a relation in which its first triangular wave signal is reversed, and supplies the triangular wave signals to a PWM block 250 including a PWM comparator, and also generates an internal clock CLK in synchronization with the first triangular wave signal CT, and supplies the internal clock to a logic block 203. An oscillation circuit for PWM is constructed by this OSC block 201, the capacitor 133 and the resistors 134, 135.

This first triangular wave signal CT and the second triangular wave signal CTI having the relation reverse to its first triangular wave signal are preferably a triangle (that is, an isosceles triangle) in which time of a rise interval is equal to time of a fall interval.

Also, the OSC block 201 does not generate the triangular wave signals CT, CTI when the resistor 134 etc. are not connected to the fifth pin 5P. However, when, for example, the first triangular wave signal CT is inputted from the outside to the fifth pin 5P, the second triangular wave signal CTI having a relation reverse to its first triangular wave signal is formed. Also, the clock CLK is formed. Therefore, also in this case, the first and second triangular wave signals CT, CTI and the clock CLK can be used in the inside of the IC 200.

A BOSC block 202 generates the triangular wave signal BCT for burst of a cycle decided by the capacitor 131 connected to the second pin 2P or the resistor 132 etc. connected to the third pin 3P. A frequency (BCT frequency) of the triangular wave signal BCT for burst is set remarkably lower than a frequency of the first triangular wave signal CT (BCT frequency<CT frequency).

An analog (DC voltage) duty signal DUTY supplied to the first pin 1P is compared with the triangular wave signal BCT for burst by a comparator 221 and an NPN 234 is driven by this comparison output through an OR circuit 239. In addition, when a digital (PWM format) duty signal DUTY is supplied to the first pin 1P, a resistor is connected to the second pin 2P and a predetermined voltage for burst is generated from the BOSC block 202.

In the logic block 203, first and second PWM control signals, a clock signal, etc. are inputted and first and second switch control signals are generated according to predetermined logic. Also, an output block 204 forms first and second switch driving signals (gate driving signals) N1, N2 according to the first and second switch control signals, and applies the driving signals to gates of the NMOSs 101, 102.

When a starting signal STB is inputted, an input to a comparator 217 exceeds its reference voltage Vref6, so that an off state of a system is released by an output of the comparator 217 and the inside of the IC 200 becomes an operating state. Also, the output of the comparator 217 is supplied to the logic block 203 through a reverse circuit 249 and can drive the logic block 203.

At the same time, a slow start block 205 is started by the output of the comparator 217. When the slow start block 205 is started, an external capacitor 141 is charged and also a slow start voltage SS increases gradually. This slow start voltage SS is supplied to the PWM block 250 and is used in a slow start of PWM control. Therefore, the PWM control is performed according to the slow start voltage SS at the time of starting.

Also, by the output of the comparator 217, a flip-flop (FF) circuit 242 is reset through an OR circuit 243.

In addition, an NMOS 246 is turned off at a point in time when the detection current IS exceeds a reference voltage Vref4 of a comparator 213 at the time of starting. Consequently, the resistor 135 is disconnected and frequencies of the first and second triangular wave signals CT, CTI for PWM are changed.

An REG block 207 generates an adjusting voltage VREG of a more stable predetermined voltage level from the power source voltage VCC, and supplies the adjusting voltage to each of the necessary circuits.

The detection current IS proportional to a current flowing through the cold cathode fluorescent lamp FL is inputted to a first error amplifier 211 and is compared with a reference voltage Vref2 (for example, 1.25 V) and an NPN 235 connected to a constant-current source I1 is controlled by an output according to its error. A collector of this NPN 235 is connected to the eighth pin 8P and a potential of this connection point becomes the feedback voltage FB and is inputted to the PWM block 250 as a comparison input.

The first triangular wave signal CT, the second triangular wave signal CTI, the feedback voltage FB and the slow start voltage SS are inputted in the PWM block 250.

Figure 3:
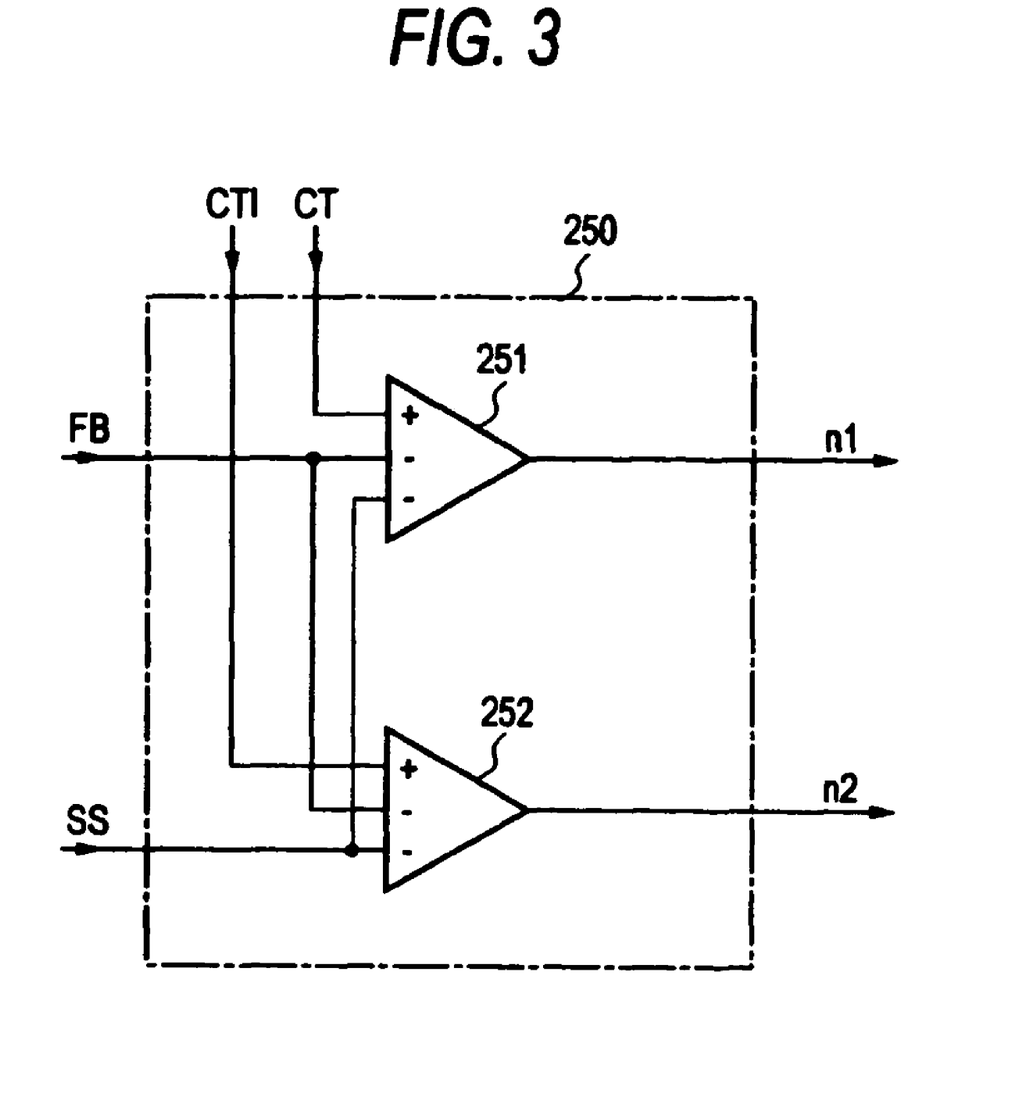
FIG. 3 is a diagram showing a circuit configuration example of a PWM block of FIG. 2.

FIG. 3 is a diagram showing a circuit configuration example of the PWM block 250. In FIG. 3, the PWM block 250 has a first PWM comparator 251 and a second PWM comparator 252.

The first triangular wave signal CT, the feedback voltage FB and the slow start voltage SS are inputted to the first PWM comparator 251, and the first triangular wave signal CT is compared with a lower voltage among the feedback voltage FB and the slow start voltage SS, and a first comparison result output (a first pulse width modulation signal) n1 is outputted.

The second triangular wave signal CTI, the feedback voltage FB and the slow start voltage SS are inputted to the second PWM comparator 252, and the second triangular wave signal CTI is compared with a lower voltage among the feedback voltage FB and the slow start voltage SS, and a second comparison result output (a second pulse width modulation signal) n2 is outputted.

Description will be made again by returning to FIG. 2. The first comparison result output n1 from the PWM block 250 and a signal from the reverse circuit 249 are inputted to the logic block 203 through an AND circuit 247 with a reverse input terminal. Also, the second comparison result output n2 from the PWM block 250 and a signal from the reverse circuit 249 are inputted to the logic block 203 through an AND circuit 248 with a reverse input terminal.

The first and second switch driving signals N1, N2 are formed by the logic block 203 and the output block 204 based on these first and second comparison result outputs n1, n2 or the clock CLK.

Also, the capacitor 136 is connected between the eighth pin 8P and the ninth pin 9P, so that the feedback voltage FB increases or decreases smoothly. Therefore, the PWM control is performed smoothly without shock.

The detection voltage VS proportional to a voltage applied to the cold cathode fluorescent lamp FL is inputted to a second error amplifier 212 and is compared with a reference voltage Vref3 (for example, 1.25 V) and an NPN 238 with a double collector structure in which one double collector is connected to the constant-current source I1 is controlled by an output according to its error. A collector of this NPN 238 is also connected to the eighth pin 8P, so that the feedback voltage FB is also controlled by the detection voltage VS. In addition, when the feedback voltage FB exceeds a reference voltage Vref1 (for example, 2.4 V), a PNP transistor (hereinafter called a PNP) 231 is turned on and an excessive increase in the feedback voltage FB is limited.

A comparator 215 compares a reference voltage Vref7 with a voltage in which the power source voltage VCC is divided by resistors 240, 241 and at a point in time when the power source voltage VCC reaches a predetermined value, its output is reversed and the FF circuit 242 is reset through the OR circuit 243. Also, an output of the comparator 215 is supplied to the logic block 203.

A comparator 218 compares the slow start voltage SS with a reference voltage Vref8 (for example, 2.2 V) and when the slow start voltage SS increases, the NPN 234 is turned on through an AND circuit 244 and the OR circuit 239. By turning on the NPN 234, a diode 232 is backward biased by a current source I2 and as a result of that, a normal operation of the first error amplifier 211 can be performed. In addition, a series circuit of a diode 237 and a PNP 236 is connected between a ground and a collector of the NPN 234 and the reference voltage Vref2 is applied to a base of the PNP 236.

When the NPN 238 in which the other double collector is connected to a constant-current source I3 is turned on by the second error amplifier 212, a voltage of a comparator 219 becomes lower than a reference voltage Vref9 (for example, 3.0V) and a comparison output is reversed. A comparator 220 compares the feedback voltage FB with a reference voltage Vref10 (for example, 3.0 V) and when the feedback voltage FB becomes higher, a comparison output is reversed.

Outputs of the comparators 219, 220 and an output of the comparator 213 are inputted to the AND circuit 244 through an OR circuit 245. An output of the AND circuit 244 is applied to a timer block 206 and a predetermined time is measured to produce an output. The FF 242 is set by an output of this timer block 206 and an operation of the logic block 203 is stopped by a Q output of this FF circuit 242. Also, the Q output of the FF circuit 242 is supplied to the nineteenth pin P19 as a FAIL signal through a reverse circuit 222.

Next, an operation of the inverter constructed as mentioned above will be described with reference to a timing chart of FIG. 4.

While the duty signal DUTY exceeds the triangular wave signal BCT for burst, PWM control is performed. On the other hand, while the duty signal DUTY falls below the triangular wave signal BCT for burst, the PWM control is stopped and electric power supply to the cold cathode fluorescent lamp FL is stopped.

A frequency of the triangular wave signal CT for PWM is, for example, 50 kHz and burst control of this signal CT is performed by the triangular wave signal BCT with a frequency of, for example, 150 Hz, so that there is no problem in vision. Then, by controlling the magnitude of the duty signal DUTY, electric power supply, that is, light quantity can be controlled more widely beyond the range capable of being supplied to the cold cathode fluorescent lamp FL by only the PWM control.

Referring concretely to a circuit operation, while the duty signal DUTY falls below the triangular wave signal BCT for burst, an output of the comparator 221 is at a low (L) level and the NPN 234 is in an off state.

Consequently, the diode 232 is forward biased by the constant-current source I2 and an input of the first error amplifier 211 becomes a high value and the NPN transistor 235 is turned on and the feedback voltage FB is regulated to a low voltage.

The first PWM comparator 251 compares a positive (+) first triangular wave signal CT with a lower voltage among two negative (−) inputs. Also, the second PWM comparator 252 compares a positive (+) second triangular wave signal CTI with a lower voltage among two negative (−) inputs. Therefore, in this case, the first and second comparison result outputs (first and second pulse width modulation signals) n1, n2 are not outputted.

Next, when the duty signal DUTY exceeds the triangular wave signal BCT for burst, the NPN 234 is turned on and the diode 232 is backward biased and is turned off. At this time, the detection current IS is at a low value, so that the first error amplifier 211 generates an output according to the inputted detection current IS and continuity of the NPN 235 is controlled.

A collector voltage of its NPN 235, that is, the feedback voltage FB gradually increases by action of the capacitor 136 connected between the eighth pin and the ninth pin and reaches a steady-state value according to the original feedback. Consequently, the first and second pulse width modulation signals n1, n2 are supplied from the PWM block 250 to the logic block 203 and the gate driving signals N1, N2 are outputted and PWM control of the NMOSs 101, 102 is performed.

Figure 5:
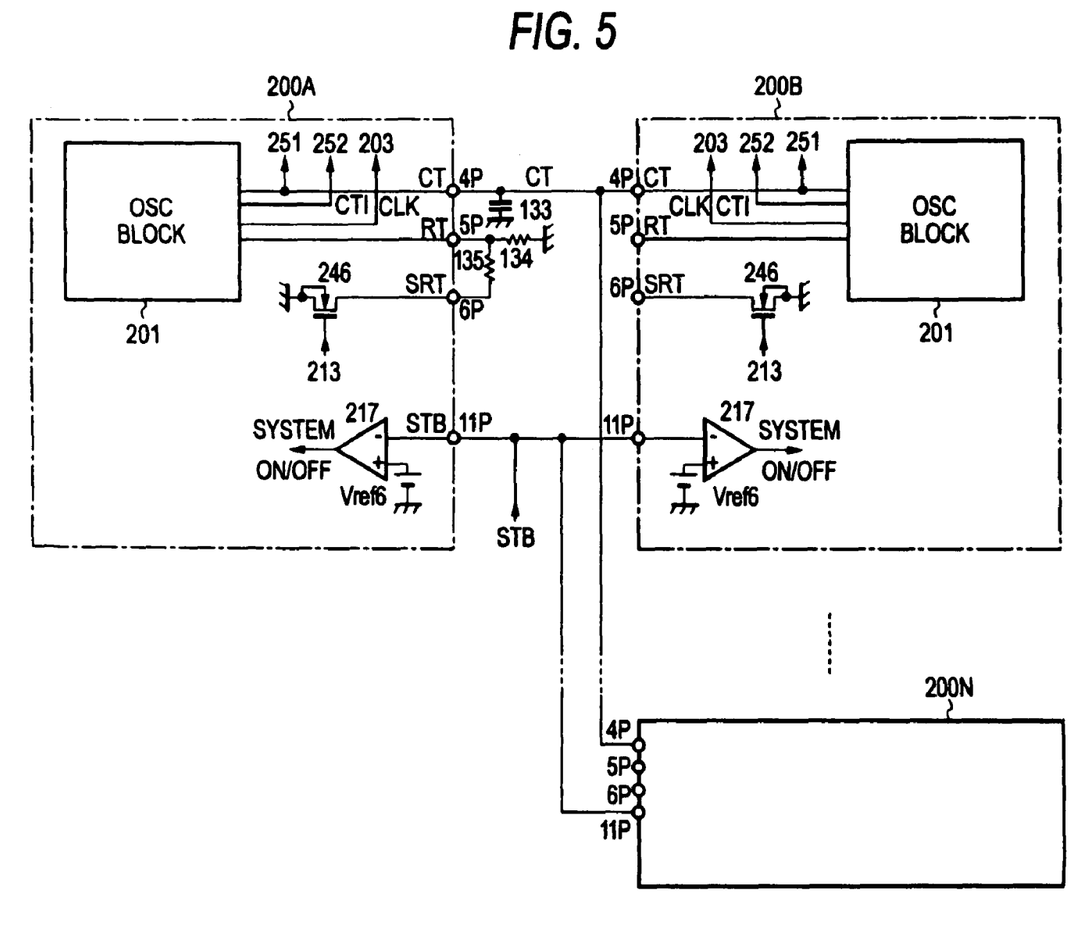
FIG. 5 is a diagram showing a configuration of a parallel running system of the inverters of the invention.

Next, an operation and a configuration of a parallel running system of the inverters constructed as mentioned above will be described with reference to FIG. 5. FIG. 5 is a circuit diagram for explanation in which the portion related to an operation of a parallel running system of the inverters is taken out of FIGS. 1 and 2 and a mutual connection relation between each of the inverters is shown.

Plural inverters run in parallel are respectively disposed close to plural CCFLs arranged in each place of a liquid crystal display. Of course, one inverter may be associated with two or more CCFLs. In this case, plural secondary windings of the transformer TR of FIG. 1 are used and power is supplied from the respective secondary windings to the cold cathode fluorescent lamp FL. Or, it may be constructed so that PWM control circuit parts of plural systems are disposed in the controller IC 200 of FIG. 1 and PWM driving signals of plural systems are outputted.

In FIG. 5, all the controller ICs 200A to 200N of each of the inverters have the same internal configuration, so that the controller IC 200A will be described typically.

In an OSC block 201, a first signal line to output a first triangular wave signal CT for PWM is connected to an external terminal 4P and also, a second signal line is connected to an external terminal 5P. Also, the OSC block 201 outputs a second triangular wave signal CTI for PWM and a clock signal CLK with the same frequency in synchronization with the first triangular wave signal CT. The first and second triangular wave signals CT, CTI are supplied to a PWM block 250 and the clock signal CLK is supplied to a logic block 203.

A comparator 217 compares a potential STB of an external terminal 11P with a reference voltage Vref6 and while the potential STB exceeds the reference voltage Vref6, a system of the controller IC 200A is turned on. In reverse, while the potential STB is lower than the reference voltage Vref6, the system of the controller IC 200A is turned off.

In the controller ICs 200A to 200N constructed thus, the external terminals 4P are mutually connected to the external terminals 11P, respectively.

When the controller IC 200A is used as a main controller, a capacitor 133 for frequency decision is connected to the external terminal 4P of the controller IC 200A between a ground and the external terminal 4P, and a resistor 134 for frequency decision is connected to the external terminal 5P between the ground and the external terminal 5P, and a starting resistor 135 is connected between the external terminal 5P and an external terminal 6P. Further, a starting signal STB is supplied to the external terminal 11P. These resistors and capacitor are not connected to the controller ICs 200B to 200N used as sub-controller ICs.

In the parallel running of the inverters constructed as described above, when the starting signal STB is set at a H level, an output of the comparator 217 reverses from the H level to a L level and a system of each of the controller ICs 200A to 200N is turned on.

By turning on the system, the OSC block 201 of the main controller IC 200A generates the clock signal CLK and the first and second triangular wave signals CT, CTI with a relatively high frequency for starting decided by the capacitor 133 for frequency decision, the resistor 134 for frequency decision and the starting resistor 135.

The system of the sub-controllers 200B to 200N is turned on almost simultaneously with the main controller IC 200A, but the resistor 134 for frequency decision (of course, the starting resistor 135) is not connected to the external terminal 5P, so that the first and second triangular wave signals CT, CTI and the clock signal CLK are not generated themselves.

The first triangular wave signal CT generated in the main controller 200A is supplied to the sub-controller ICs 200B to 200N connected mutually respectively. In the sub-controller ICs 200B to 200N, the second triangular wave signal CTI and the clock signal CLK are formed based on the first triangular wave signal CT supplied from the main controller IC 200A.

Consequently, sub-inverters operate in synchronization with a main inverter having the main controller 200A, so that all the inverters operate synchronously in the same phase.

Then, the respective inverters can be arranged close to CCFLs (backlight light sources of a liquid crystal display) distributed and arranged.

Therefore, the plural CCFLs synchronously emit light, so that a situation in which the light mutually interferes and flickers can be prevented. Also, each of the inverters is arranged close to each of the CCFLs, so that an influence on other apparatus by routing high-voltage wiring can be reduced. Also, parasitic capacitance of the CCFL can be effectively used in resonance with a transformer.

Particularly, only the first triangular wave signal CT is simply transmitted between plural inverters to run in parallel for synchronous running, so that the number of connection lines between each of the mutual inverters can be reduced.

In addition, the above embodiment is constructed so that the external terminals 11P of all the controller ICs 200A to 200N are mutually connected and all the controller ICs, that is, all the inverters are started and stopped in common. Instead of this, it may be constructed so that a starting signal ST is given to individual controller ICs or a grouped controller IC group and inverters are started and stopped separately. Also in this case, synchronous running of the inverters can be performed without trouble.

Thus, each of the inverters is arranged close to plural loads requiring a high voltage and also an operation or a non-operation of oscillation is decided by the fact as to whether or not a resistor for frequency decision is connected to each of the inverters. Then, by disposing the OSC block 201 for forming the clock signal CLK and the second triangular wave signal CTI based on the first triangular wave signal CT supplied from the outside, the plural loads can easily be controlled synchronously in the same phase using one inverter as a master and the other inverters as a slave.

Also, the same controller IC is used in each of the inverters and predetermined terminals with the same function are mutually connected in common and only a main controller IC is made to perform an oscillation operation, so that a configuration of the whole system is simplified and also the number of loads used is not limited.

Figure 6:
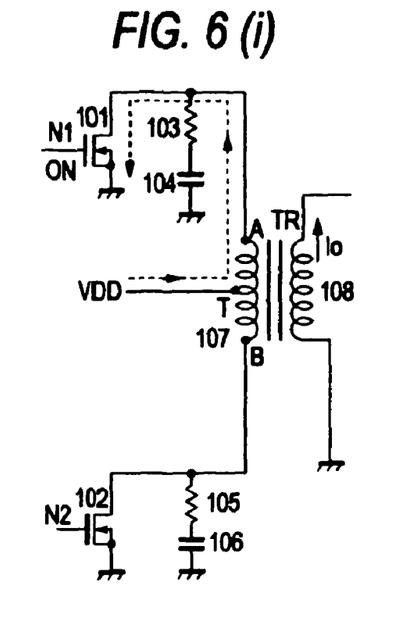
FIG. 6 is a diagram showing an operating state at each timing of FIG. 4.

Next, an operation of the inverters constructed as mentioned above will be described with reference to an operating state diagram at each timing of FIG. 6 and waveform diagrams of FIGS. 7 and 8 together with the timing chart of FIG. 4.

Figure 4:
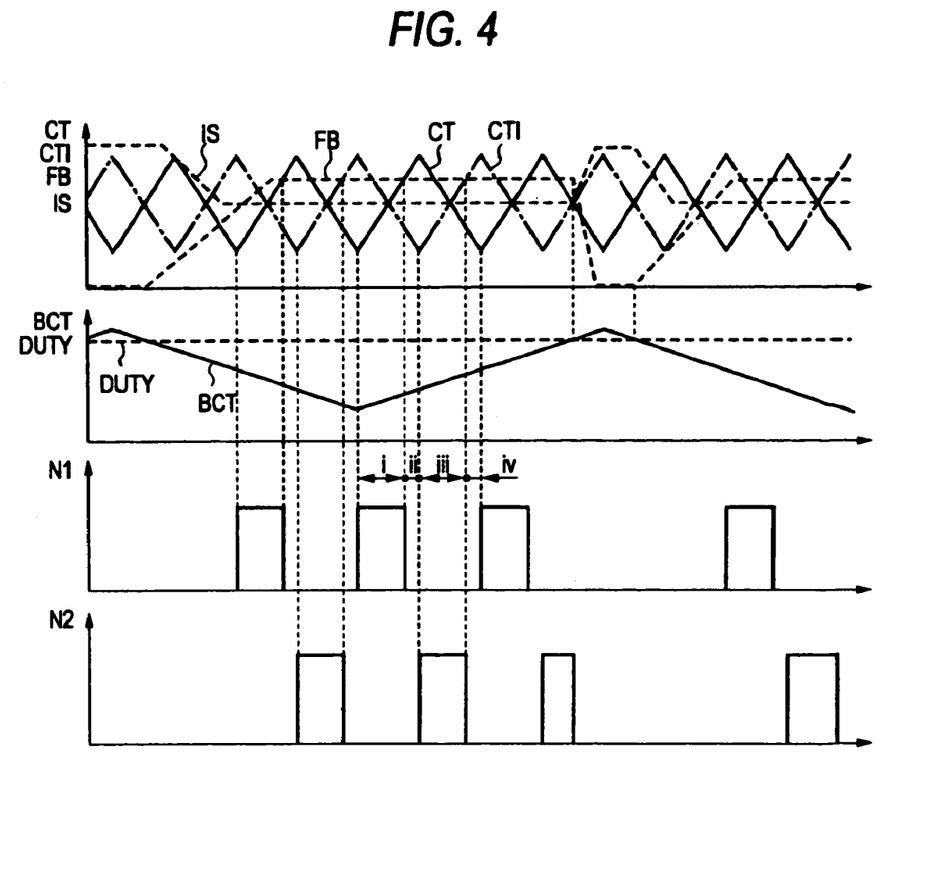
FIG. 4 is a timing chart of the inverter of FIG. 1.

As shown in FIG. 4, at a point in time of one vertex (for example, the lower vertex) of the first triangular wave signal CT, the first switch driving signal N1 is turned on and is at a H level until the first triangular wave signal CT immediately after the point in time becomes equal to the feedback signal FB. Since the first semiconductor switch 101 is turned on by the H level of the first switch driving signal N1, the on state is continued for only this period.

Also, at a point in time of one vertex (for example, the lower vertex) of the second triangular wave signal CTI, the second switch driving signal N2 is turned on and is at a H level until the second triangular wave signal CTI immediately after the vertex becomes equal to the feedback signal FB. Since the second semiconductor switch 102 is turned on by the H level of the second switch driving signal N2, the on state is continued for only this period.

Then, the first and second switch driving signals N1, N2 are generated at timing at which an off period during which all the first and second semiconductor switches 101, 102 are turned off is set between periods for which the first semiconductor switch 101 and the second semiconductor switch 102 are alternately turned on and the switches are alternately in the on states At an interval i of FIG. 4, the gate driving signal N1 is at a H level and the NMOS 101 is turned on and a current flows through the primary winding 107 from the DC power source BAT (power source voltage VDD) in a first direction from the center tap T through the first terminal A. This state is shown in FIG. 6(i). A voltage (hereinafter called an A point voltage) Va of the first terminal A is the ground voltage GND as shown in FIG. 7, and a current does not flow through a first snubber circuit made of a series circuit of the resistor 103 and the capacitor 104.

In the case of reaching an interval ii, the gate driving signal N1 becomes a L level and all the NMOSs 101, 102 become an off state. This state is shown in FIG. 6(ii). At this interval ii, a current of the first direction flows through the DC power source BAT (power source voltage VDD) through the second terminal B and the center tap T from a second snubber circuit made of a series circuit of the resistor 105 and the capacitor 106 or a body diode of the NMOS 102 by the stored energy of the transformer TR. In this state, the A point voltage Va becomes a voltage (2×VDD+Vf) in which a voltage Vf dropped by the body diode is added to two times the power source voltage VDD as shown in FIG. 7.

At an interval iii, the gate driving signal N2 is at a H level and the NMOS 102 is turned on and a current flows through the primary winding 107 from the DC power source BAT (power source voltage VDD) in a second direction from the center tap T through the second terminal B. This state is shown in FIG. 6(iii). The A point voltage Va is two times (2×VDD) the power source voltage VDD as shown in FIG. 7.

In the case of reaching an interval iv, the gate driving signal N2 becomes a L level and all the NMOSs 101, 102 become an off state. This state is shown in FIG. 6(iv). At this interval iv, a current of the second direction flows through the DC power source BAT (power source voltage VDD) through the first terminal A and the center tap T from a first snubber circuit or a body diode of the NMOS 101 by the stored energy of the transformer TR. In this state, the A point voltage Va becomes a voltage (−Vf) lower than the ground voltage by a voltage Vf dropped by the body diode as shown, in FIG. 7.

Figure 7:
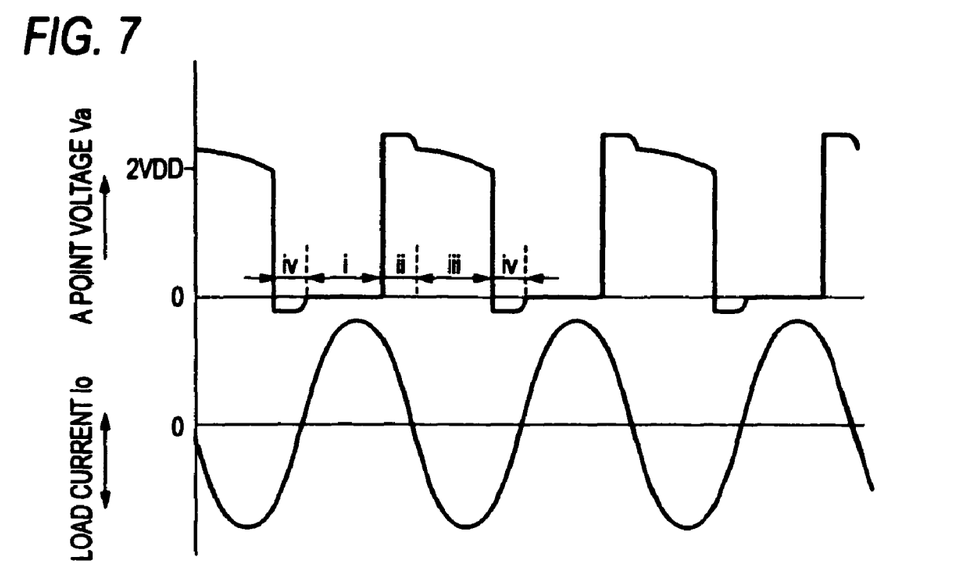
FIG. 7 is a voltage waveform diagram of a primary winding of a transformer in the inverter of the invention.
Figure 8:
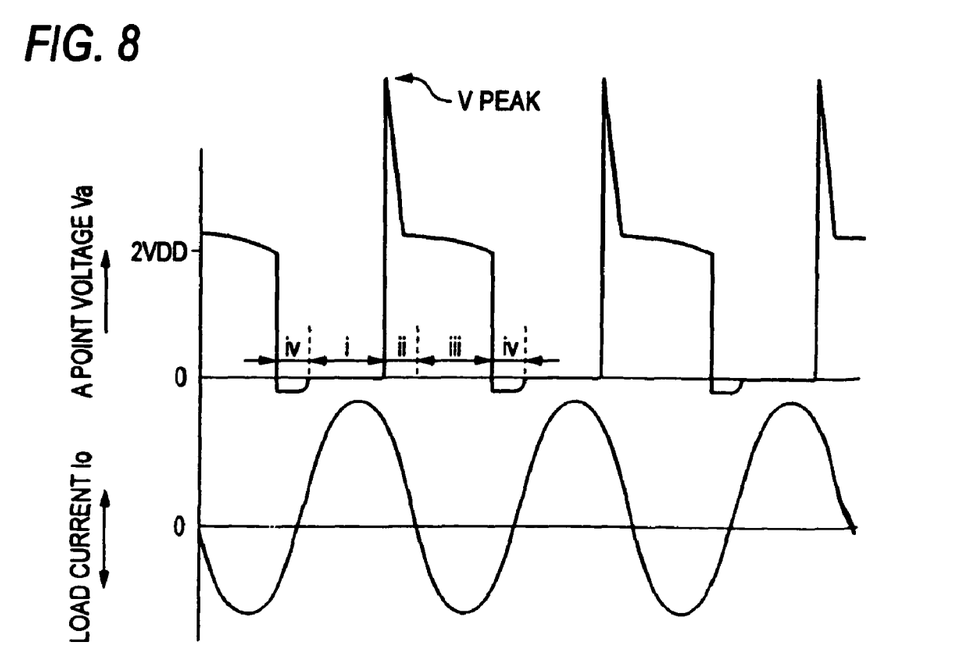
FIG. 8 is a voltage waveform diagram of a primary winding of a transformer in an inverter used as the related art.

FIG. 7 is a diagram showing a load current Io and an A point voltage Va in the embodiment of the invention provided with first and second snubber circuits, and FIG. 8 shows a load current Io and an A point voltage Va in correspondence with FIG. 7 in the case where first and second snubber circuits are not disposed.

In FIG. 7 showing characteristics of the invention, an upper limit of the A point voltage Va becomes a voltage (2×VDD+Vf) in which a voltage Vf dropped by a body diode is added to a voltage two times the power source voltage VDD. On the other hand, in FIG. 8 showing characteristics of the case where the first and second snubber circuits are not disposed, in the A point voltage Va, a very high abnormal voltage Vpeak with spike shape occurs at the time of entering an interval ii. As a result of measurement, this abnormal voltage Vpeak becomes about 5 to 6 times the power source voltage VDD.

When this abnormal voltage Vpeak occurs, it is necessary to use an element designed to withstand a high voltage capable of withstanding the abnormal voltage Vpeak and also, the abnormal voltage Vpeak results in a noise generation source to the periphery.

Particularly, in a power source circuit with a push-pull configuration as described in the invention, a voltage two times the power source voltage VDD is always applied to the terminals A, B, that is, the switch elements 101, 102, so that suppression of the abnormal voltage reaching 5 to 6 times the power source voltage VDD is particularly effective.

Figure 9:
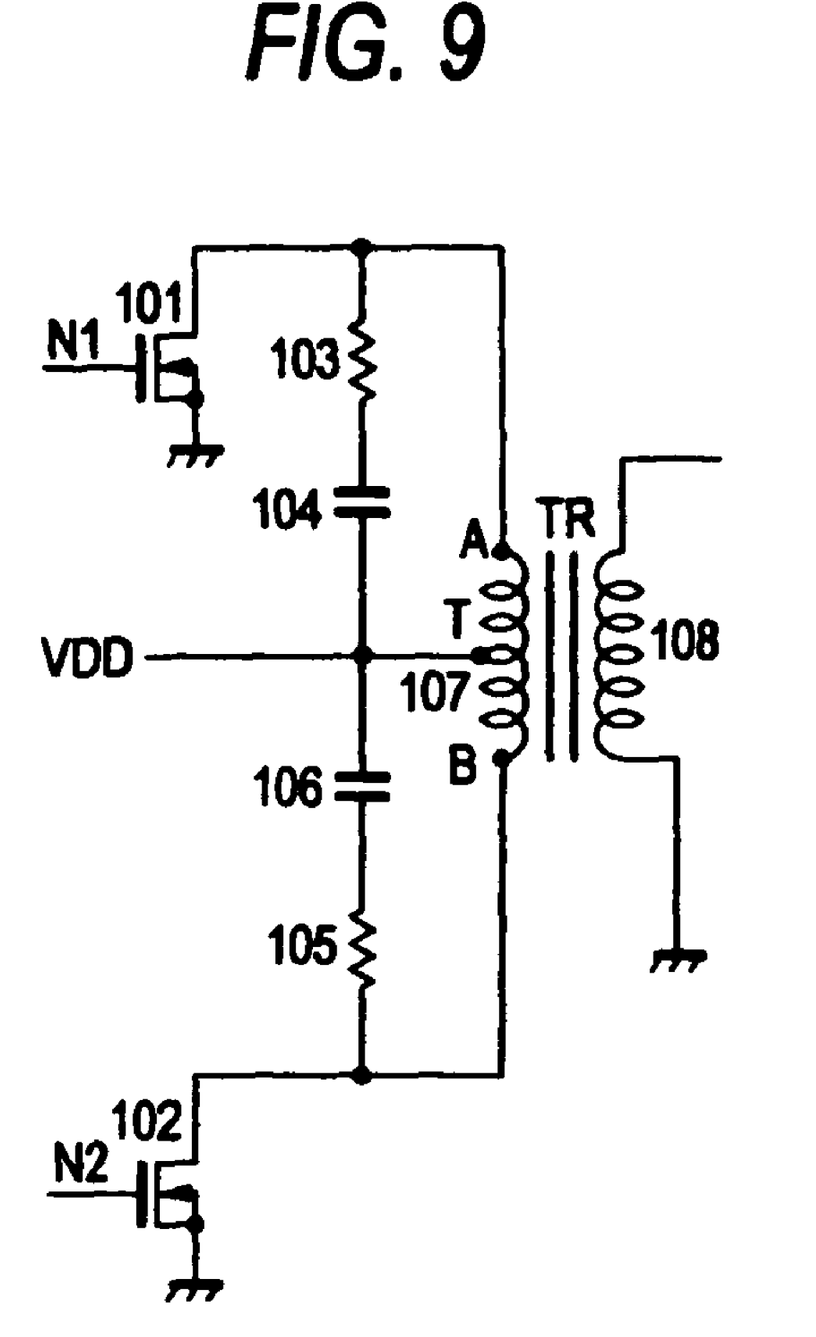
FIG. 9 is a diagram showing another configuration example of a snubber circuit.

FIG. 9 is a diagram showing another configuration example of a snubber circuit. In FIG. 9, a first snubber circuit made of a series circuit of a resistor 103 and a capacitor 104 is disposed between a center tap T and one end A of a primary winding 107 and also, a second snubber circuit made of a series circuit of a resistor 105 and a capacitor 106 is disposed between the center tap T and the other end B of the primary winding 107.

Also in an inverter of this FIG. 9, an abnormal overvoltage occurring in terminals A, B of the primary winding 107 can be suppressed in a manner similar to the first and second snubber circuits in FIG. 1. That is, the first and second snubber circuits could be connected between each of the ends A, B of the primary winding 107 and a potential point VDD, GND with low impedance. In addition, the resistor 103, 105 for snubber may be omitted in each of the snubber circuits of FIG. 1 or FIG. 9.

What is claimed is:

1. A parallel running system of a plurality of DC-AC conversion apparatuses, the system comprising:
    a transformer having a primary winding with a center tap and at least one secondary winding, the center tap being connected to a first potential point of a DC power source;
    a first semiconductor switch connected between one end of the primary winding and a second potential point of the DC power source;
    a second semiconductor switch connected between the other end of the primary winding and the second potential point; and
    N DC-AC conversion apparatuses, N being an integer of 2 or more, comprising a controller IC for controlling the first and second semiconductor switches for driving a load,
    wherein the controller IC comprises:
    a current detection signal input terminal to which a current detection signal is inputted, the current detection signal being based on a current flowing through the load connected to the at least one secondary winding;
    an oscillator block for generating a first triangular wave signal and a second triangular wave signal, the second triangular wave signal being reversed relative to the first triangular wave signal;
    a PWM control signal generation circuit for generating a PWM control signal for switching the first and second semiconductor switches based on the first triangular wave signal, the second triangular wave signal, and an error signal, the error signal being generated based on the current detection signal;
    a connection terminal to which a resistor for frequency decision is to be connected, the resistor for frequency decision being used for setting frequencies of the first and second triangular wave signals,
    wherein the resistor for frequency decision is connected to only the connection terminal provided in one of the N DC-AC conversion apparatuses, so that only the oscillator block of said one of the DC-AC conversion apparatuses generates the first and second triangular wave signals,
    wherein only the first triangular wave signal of the first and second triangular wave signals generated from said one of the DC-AC conversion apparatuses is supplied to other DC-AC conversion apparatuses, and
    wherein all of the N DC-AC conversion apparatuses perform in-phase PWM control in synchronization with each other by using the first triangular wave signal.

2. The parallel running system according to claim 1, wherein the controller IC further comprises:
    a burst signal generation circuit for generating a burst signal in which a first state and a second state are repeated; and
    a burst control circuit for halting switching operations of the first and second semiconductor switches, which are performed by the PWM control signal, when the burst signal is in the first state.

3. The parallel running system according to claim 1, wherein a resistance value of the resistor for frequency decision at the time of starting of the DC-AC conversion apparatus is smaller than the resistance value after said starting.

4. The parallel running system according to claim 1, wherein the controller IC further comprises:
    a starting signal input terminal to which a starting signal for starting the controller IC is inputted, wherein the starting signal is common to the N DC-AC conversion apparatuses.

5. The parallel running system according to claim 2, wherein the burst signal is inputted to the PWM control signal generation circuit.

6. The parallel running system according to claim 2, wherein the burst signal generation circuit is coupled to the current detection signal input terminal, and
    wherein the burst signal generation circuit includes:
    a current source for supplying a constant current;
    a switch coupled to one end of the current source and performing ON/OFF operation based on the burst signal; and
    a diode used to supply the constant current of the current source to the current detection signal input terminal when the burst signal is in the first state.

7. The parallel running system according to claim 1, wherein the PWM control signal generation circuit includes an error amplifier for generating the error signal based on the current detection signal and a reference signal, and
    wherein the PWM control signal generation circuit switches the semiconductor switch based on the error signal.

8. The parallel running system according to claim 1, wherein the error signal is set to almost zero by the burst signal when the burst signal inputted to the error amplifier is in the first state.

9. The parallel running system according to claim 1, wherein the controller IC further comprises:
    an error signal output terminal for outputting the error signal to the outside of the controller IC.

* * * * *